United States Patent [19]

Gretz

[11] Patent Number: 5,736,674

[45] Date of Patent: Apr. 7, 1998

[54] ELECTRIC BOX EXTENDER

[75] Inventor: Thomas J. Gretz, Clarks Summit, Pa.

[73] Assignee: Arlington Industries, Inc., Scranton, Pa.

[21] Appl. No.: 773,413

[22] Filed: Dec. 27, 1996

Related U.S. Application Data

[63] Continuation-in-part of Ser. No. 667,083, Jun. 20, 1996, abandoned.

[51] Int. Cl.[6] .................................................. H02G 3/08
[52] U.S. Cl. .................................................. 174/50
[58] Field of Search .......................... 174/50, 17 R, 174/52.6, 58, 63, 66, 67; 220/3.2, 3.4, 3.8, 4.02, 4.03, 241, 242

[56] References Cited

U.S. PATENT DOCUMENTS

| | | | |
|---|---|---|---|
| 3,059,803 | 10/1962 | Holsinger | 220/3.4 |
| 4,134,636 | 1/1979 | Kleinatland et al. | 339/122 R |
| 4,289,921 | 9/1981 | Gartner et al. | 174/48 |
| 4,529,834 | 7/1985 | Nattel | 174/53 |
| 5,375,728 | 12/1994 | West | 220/3.8 |

*Primary Examiner*—Kristine L. Kincaid
*Assistant Examiner*—Dhiru R. Patel

[57] ABSTRACT

An extender for bringing electrical boxes flush with newly installed sheet stock in a renovated building. The extender is a one-piece plastic molded box having an open face member, an open back, flanges extending from the face member, and four wings extending from the inward side of the face member. The extender can be inserted slidably into an existing electrical box with the four wings flexing toward each other to accommodate the box with flanges being flush with the surface of the newly installed sheet rock.

15 Claims, 4 Drawing Sheets

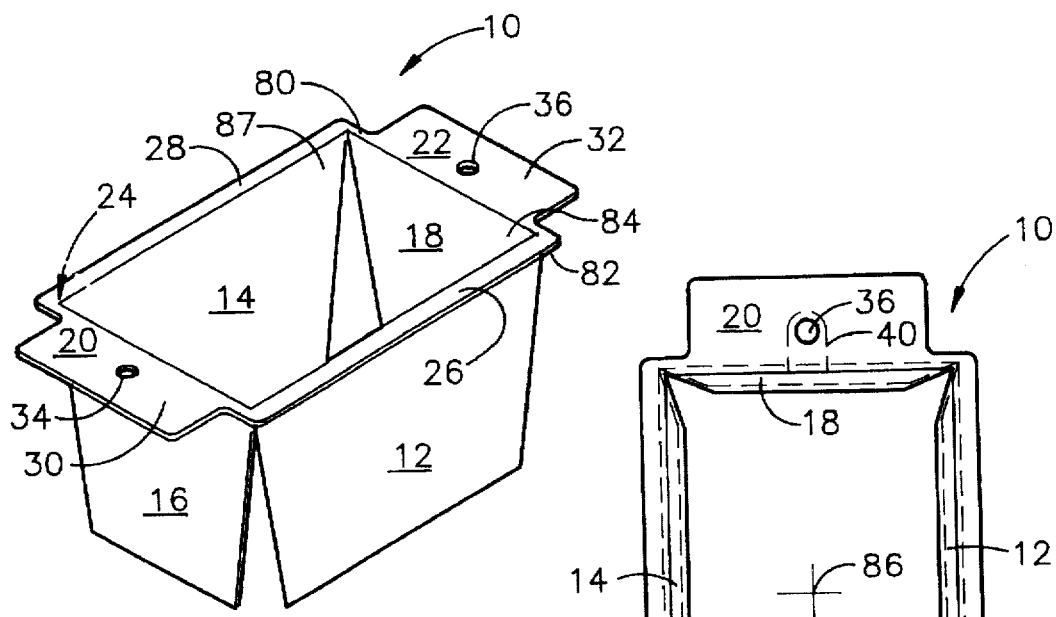
FIG. 1
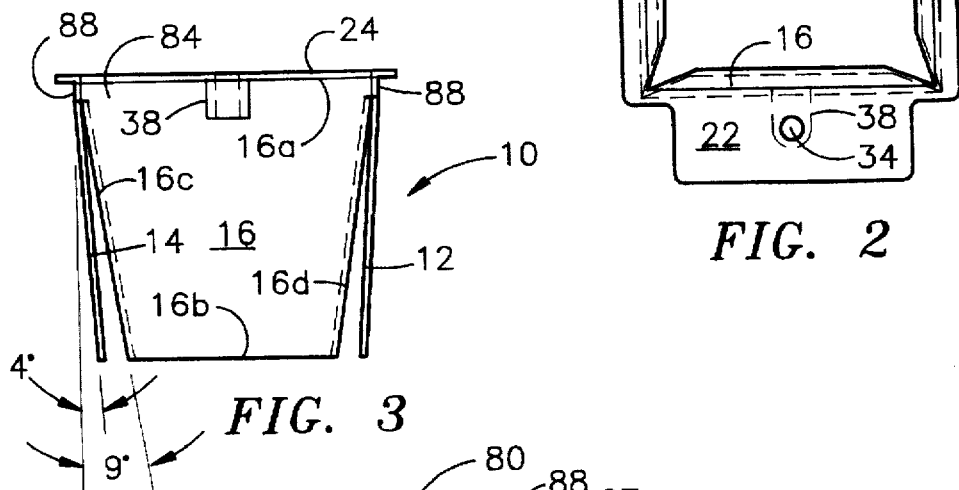
FIG. 2
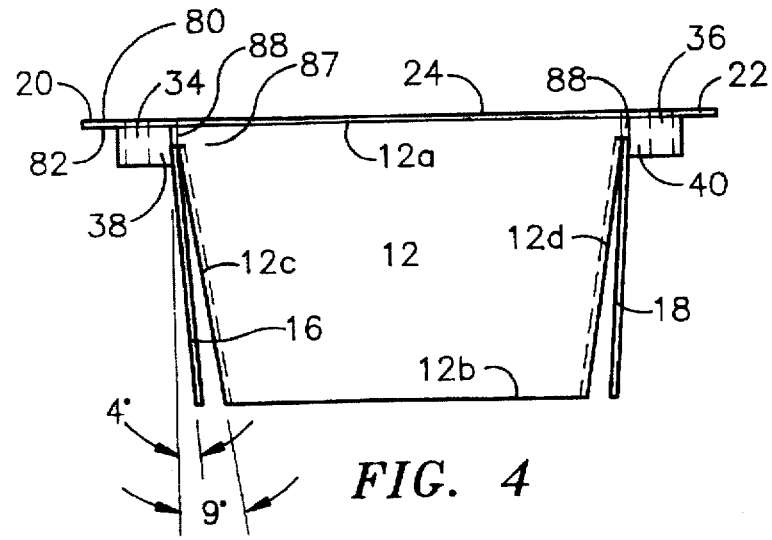
FIG. 3
FIG. 4

ELECTRIC BOX EXTENDER

CROSS-REFERENCE TO RELATED APPLICATION

This is a continuation-in-part of application No. 08/667,083, filed Jun. 20, 1996, now abandoned.

FIELD OF THE INVENTION

This invention relates to electric box extensions, and particularly, to an improved electrical box extension that is easier to install and accepts bulky electrical devices such as a ground fault circuit interruptor (GFCI).

BACKGROUND OF THE INVENTION

Electrical boxes are commonly used to provide electrical service at convenient locations within buildings. The electrical boxes are commonly formed of plastic or metal and are usually securely fastened by screws or nails to the framework within the building. In newly constructed buildings, the open face of the electrical box, in which an electrical device such as an outlet or switch will be mounted, is usually flush with the surface of the wall or ceiling in which it is installed.

When existing buildings are renovated or restored, it is common for renovators to lay down new sheet stock such as sheet rock, paneling, etc., over the existing ceilings or walls. This causes the existing electrical boxes to become recessed within the wall by the thickness of the new sheet stock.

To solve this problem, box extenders of several different types have been developed. One type relies on a friction fit to hold the box extender in the existing electrical box. This extender has the disadvantage of not providing a secure attachment to the existing box, and the electrical device may slide further within the box making it hard to reach.

Another type of extender consists of an extension having walls of approximately the same configuration as the existing box and of fixed thickness. The extender is available in several thicknesses to accommodate several different sheet stock thicknesses. Although there are many thicknesses available, the extender sometimes is not of a proper thickness to bring the existing box flush with the new surface, and this creates an aesthetically undesirable appearance.

Another type of extender includes a body portion having at least one wall and open faces and a second open face. The extender includes side flanges having holes that align with brackets that are connected to the electrical box. This extender is difficult to use and install as brackets must be firmly attached to the electrical box and then two screws are used to attach each flange of the extender to the electrical box.

As described by these several limitations, extenders of the present art have not proven fully satisfactory for extending electrical boxes flush with the new walls or ceilings in a renovated or restored building.

SUMMARY OF THE INVENTION

This invention consists of an extender for bringing electrical outlets, switches, ground fault circuit outlets, etc., flush with newly installed sheet stock or the like in a renovated building. A first embodiment of the invention consists of a one-piece molded plastic box extender having an open face, an open back, and multiple flexible wings extending from the open face. The extender can be inserted slidably into an existing electrical box to extend an electrical device such as an outlet, switch, etc., so that it will be flush with a new surface. A second embodiment is similar to the first embodiment except the wings are separate pieces from the open face. A third embodiment consists of a one-piece unit having an open face, open back, and a continuous peripheral wall extending from the front face which can be trimmed away or cut into separate wings to suffice any installation.

OBJECTS AND ADVANTAGES

One object of the present invention is to provide a one-piece plastic electrical box extender that will extend electrical boxes from a position deep within an interior surface of a building to a new position that is flush with a newly installed surface. The situation of having to bring electrical boxes flush with a new surface is commonly encountered when old buildings are renovated by laying down new sheet stock on top of existing sheet stock on walls and ceilings.

A second object of the invention is to ease the task of extending existing electrical boxes to a new surface. The invention is easily applied by inserting the extender slidably within the existing electrical box and pushing it within the box until flanges on the extender are flush with the new surface. New electrical connections are made and two screws are then inserted through the ears of the electrical device into flanges of the box extender and into the existing apertures on the pre-existing electrical box and then tightened to complete the installation. The invention is inexpensive and very easy to install when compared with extenders that are presently used in the trade.

Other objects and advantages of the preferred embodiment will become apparent when reading the attached description of the invention and referring to the associated drawings.

DESCRIPTION OF THE DRAWINGS

FIG. 1 is a perspective view of the preferred embodiment of the electric box extender.

FIG. 2 is a top view of the electric box extender shown in FIG. 1.

FIG. 3 is an end view of the preferred embodiment of the electric box extender with the opposite end being identical.

FIG. 4 is a side view of the preferred embodiment of the electric box extender with the opposite end being identical.

DESCRIPTION OF THE INVENTION

Figure 5:
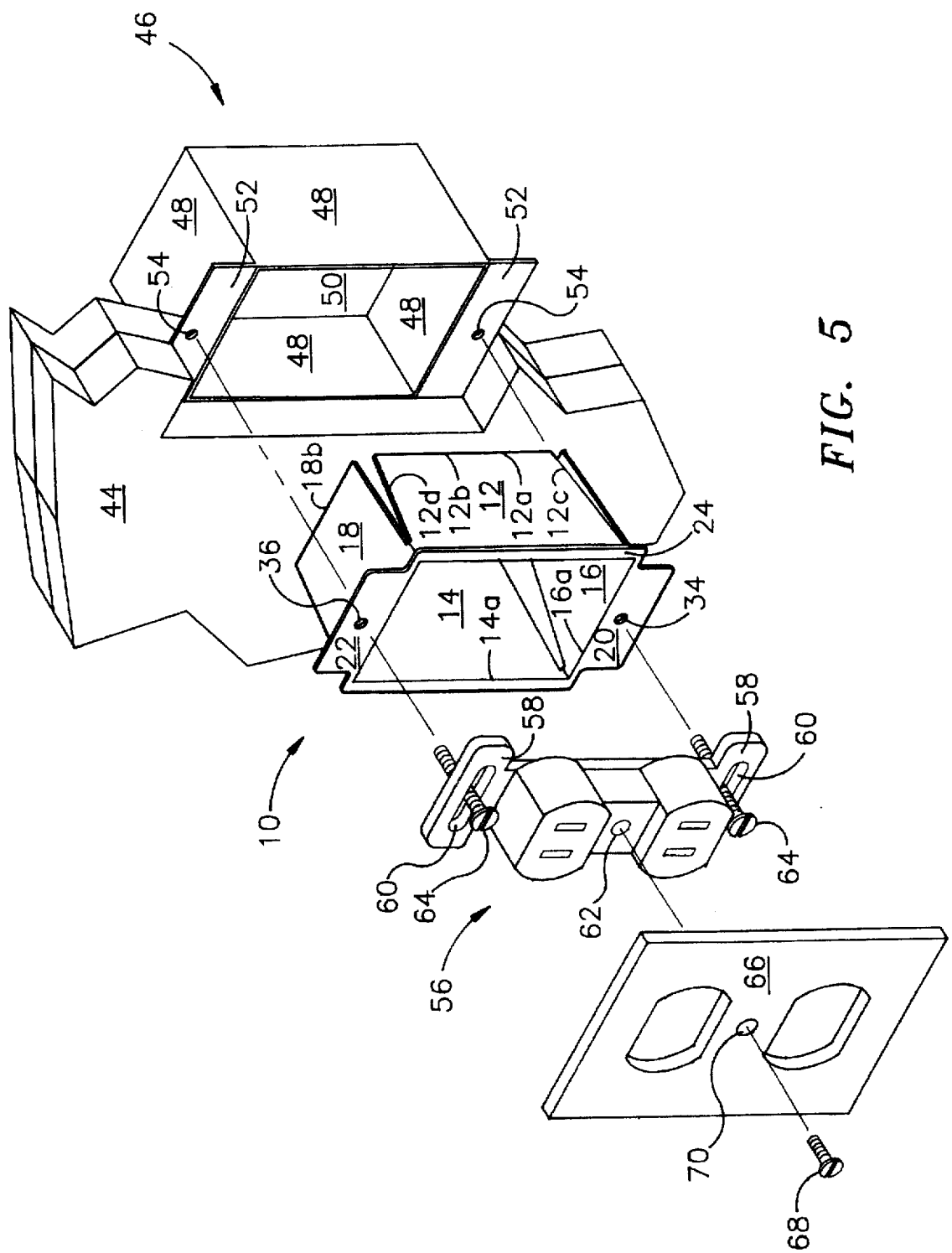
FIG. 5 is an exploded perspective view of the preferred embodiment of the electric box extender including the electric box within a wall, a duplex outlet and a cover plate.

The invention is an electric box extender for extending an existing electrical box to bring the extended box flush with a newly installed surface in a building. A perspective view of the preferred embodiment of the box extender 10 of the present invention is shown in FIG. 1. The box extender 10 consists of a one-piece plastic member having four integral wings 12, 14, 16, 18 extending from a face member 24. The wings consist of side wings 12, 14 and end wings 16, 18. The face member 24 has an outward side 80, an inward side 82, side portions or flanges 26, 28 and end portions 30, 32. The side flanges are narrow being from about 1/8 inch to about 3/8 inch but preferably approximately 1/4 inch in width and serve as their primary function to stiffen the long side of the face member 24. Flanges 20, 22 extend from the side portions 26, 28 of the face. The flanges have apertures 34, 36 for receiving screws that are typically 0.145 inches in diameter. The end flanges 20, 22 stiffen the short sides of face member 24 but also are readily wide, being preferably approximately 5/8 inches in width, and serve to carry aperture 36 and to rest on the new wall but need not do so. The side flanges 26, 28 and end flanges 20, 22 are flat and thin and approximately 0.045 inches thick so that they can fit in the recessed underside (not shown) of cover plate 66. While the side flanges extend approximately 3.0 inches, which is greater than the approximately 2.8 inch length of the tubular opening of the box extender, the end flanges 20, 22 extend only approximately 1.5 inches in length which is shorter than the width of the tubular opening of the box extender which is approximately 1.8 inches wide. The end flanges preferably have a U-shaped cut-out (not shown) centered on the outer edges with a width of approximately 0.3 inches and a depth of approximately 0.2 inches. This cut-out is to accommodate the heads of screws in some installations but is not necessary as the thin flange can adapt itself if the cut-out is not used. The face member 24 and wings 12, 14, 16, 18 form a generally rectangular tubular body portion capable of receiving an electrical device and of being received within an electrical box.

FIG. 2 is a top view of the box extender 10 showing the flanges 20, 22 with apertures 34, 36 and the inward angled wings 12, 14, 16, and 18.

As shown with end wing 16 in the end view of FIG. 3, the side wings 12, 14 in their relaxed states are typically angled inwardly toward the center axis 86 of the box extender 10 at a four degree angle from perpendicular with the face 24. The axis 86 is shown in FIG. 2 and is located in the center of face member 24. The end wings (16 is depicted) are trapezoidal in shape with base end 84 containing the base edge 16a and the opposite inward edge 16b parallel. Side edges 16c and 16d are typically at an angle of 9 degrees from perpendicular with the face 24.

As shown in FIG. 4, the side wings (12 is depicted) in their relaxed states are also typically angled inwardly toward the center of the box extender 10 at a four degree angle from perpendicular with the face 24. The side wings (12 is depicted) are trapezoidal in shape with the base end 87 containing the base edge 12a and the opposite inward edge 12b parallel. Side edges 16c and 16d are typically at an angle of 9 degrees from perpendicular with the face 24. Screw guides, 38 and 40, extend from and are integral with flanges 20 and 22 respectively, contain apertures 34, 36 and provide support and guidance for the screws that will be inserted through the apertures. The screw guides are approximately 1/8 inch to 3/8 inch deep but preferably 1/4 inch so as to give adequate guidance length for the screws.

The four wings 12, 14, 16, and 18 are each flat thin members having a thickness of approximately 0.035 to 0.050 inches and preferably 0.042 inches. Adjacent wings are joined by base connection 88 at their base ends 84, 87 for a length of approximately 1/8 to 3/8 inches and preferably 1/4 inch. This in effect provides a right angle rigid member around the outer rectangular opening of the box extender to reinforce and stiffen it. The base ends 84, 87 are the areas from the inward side 82 of the face member 24 inward as far as the base connections 88 extend. The flexing of the wings is a cantilever bending about the imaginary line connecting the inwardmost end of the base connections 88. All four wings have their side edges converging toward the inward edge. The side wings 12 and 14 are preferably approximately 2 7/8 inches at their base end and 2 3/16 inches at their inward edges and 1 3/4 inches deep. The end wings 16 and 18 are preferably approximately 1 7/8 inches at their base end and 1 1/4 inches at their inward edge and 1 3/4 inches deep.

The electrical box extender 10 is typically installed as shown in FIG. 5, an exploded perspective view with a cutaway section of an existing wall 42 and a newly installed wall 44. This is the typical arrangement when installing the box extender 10 with the existing electrical box 46 installed flush with the existing wall 42, a newly installed wall 44 on top of the existing wall 42, an opening cut in the newly installed wall 44, an electrical device 56 (in this case a duplex outlet), and a cover plate 66.

Referring to FIG. 5, the existing electrical box 46 has side walls 48 and a back wall 50. The electrical box 46 has flanges 52 and threaded apertures 54 within the flanges for receiving screws 64. These threaded apertures 54 are the same apertures that are in the electrical box 46 originally for receiving the screws that thread through the ears of an electrical device and secure the device to the box.

In a common application of the invention, the existing outlet (not shown in FIG. 5) is removed from the electrical box 46. The box extender 10 is then pushed into the electrical box 46 with the side wings 12, 14 and end wings 16, 18 slidably engaging the side walls 48 of the electrical box 46. As the side wings 12, 14 and end wings 16, 18 of the box extender are cantilevered at an angle of typically 4 degrees from perpendicular with the face 24 of the box extender 10, and as they are formed of a flexible plastic material, the wings 12, 14, 16, 18 tend to flex inwardly toward the axis of the center of the face member 24 and of the electrical box 46 thereby accommodating a wide range of sizes of electrical boxes. If the existing wires enter the electrical box 46 from the side walls 48, and those wires interfere with the travel of the wings of the box extender 10 into the box 46, then a portion of the plastic side wings 12, 14, 16, 18 may be easily manually trimmed with scissors or the like to keep the wires from interfering with the travel of the wings into the electrical box 46. If the existing wires enter the electrical box 46 through the back wall 50, there will usually be no interference of the wiring with the travel of the wings of the box extender 10 into the electrical box 46 and trimming of the wings is therefore unnecessary.

The box extender 10 is pushed into the electrical box 46 until part of the inward surface of flanges 20 and 22 and sometimes side portions 26 and 28 abut the newly installed wall 44. If the existing electrical box 46 is a shallow box, unable to accommodate the entire travel of the wings 12, 14, 16, 18 into the box 46, then the wings of the box extender 10 may be trimmed with scissors or the like so that the wings do not extend as far from the face 24 as constructed. The box extender 10 when properly trimmed will therefore accommodate a shallow electrical box.

After the box extender 10 is fully seated and abutted against the newly installed wall 44 and aligned with the electrical box 46, the duplex outlet 56, switch, or other electrical device is aligned with the box extender 10. FIG. 5 depicts a duplex outlet 56 in alignment with the box extender 10 which in turn is in alignment with the electrical box 46. The slots 60 in the ears 58 of the duplex outlet 56 are in alignment with the apertures 34, 36 in the respective flanges 20, 22 of the box extender 10 and the apertures 34, 36 are in also in alignment with the threaded apertures 54 in the electrical box 46. One long screw 64 is pushed through slot 60 in the top ear 58 of the duplex outlet 56, through the aperture 36 in flange 22, and screwed into threaded aperture 54 in the top flange 52 of the electrical box 46. A second long screw 64 is pushed through slot 60 in the bottom ear 58 of the duplex outlet 56, through the aperture 34 in flange 20, and screwed into threaded aperture 54 in the bottom flange 52 of the electrical box 46. Both screws 64 are then tightened the proper amount to abut the inward surfaces of flanges 20 and 22 against the surface of the newly installed wall 44 and to securely fasten the duplex outlet 56 to the box extender 10 and the electrical box 46. Both screws 64 may be trimmed to a shorter length or shorter screws may be used if required by a thin newly installed wall 44 or a shallow electrical box 46.

After the duplex outlet 56, switch, ground fault circuit outlet, or other electrical device is secured to the box extender 10 and the electrical box 46, then a cover plate 66 may be fastened with a screw 68 through the aperture 70 in the cover plate 66 and into the threaded aperture 62 in the duplex outlet 56, switch, ground fault circuit outlet, or other electrical device. This completes the task of extending the existing electrical device to the new wall surface 44 without installing a new electrical box or moving the existing electrical box 46. The electrical device is now flush with the new wall surface 44 and is aesthetically pleasing to the eye.

The material of construction of the box extender of this invention may be polyvinyl chloride (PVC) or any similar rigid or semi-rigid plastic such as, preferably, flame retardant polypropylene rated 105° C. continuous use made by A. Schulman Company as RPP-1174. The plastic should have sufficient flexibility to enable the wings to flex or convergingly bend towards the axis of the face member as described above.

Although the typical application shown in these drawings is for the extension of a standard rectangular electrical box, a similar box extender could be formed with wings for other shaped boxes. For example, a round electrical box that is commonly used for a ceiling light may be extended by using a non-rectangular box extender with a multiplicity of wings designed to enter and slidably engage the interior walls of the round box.

Figure 6:
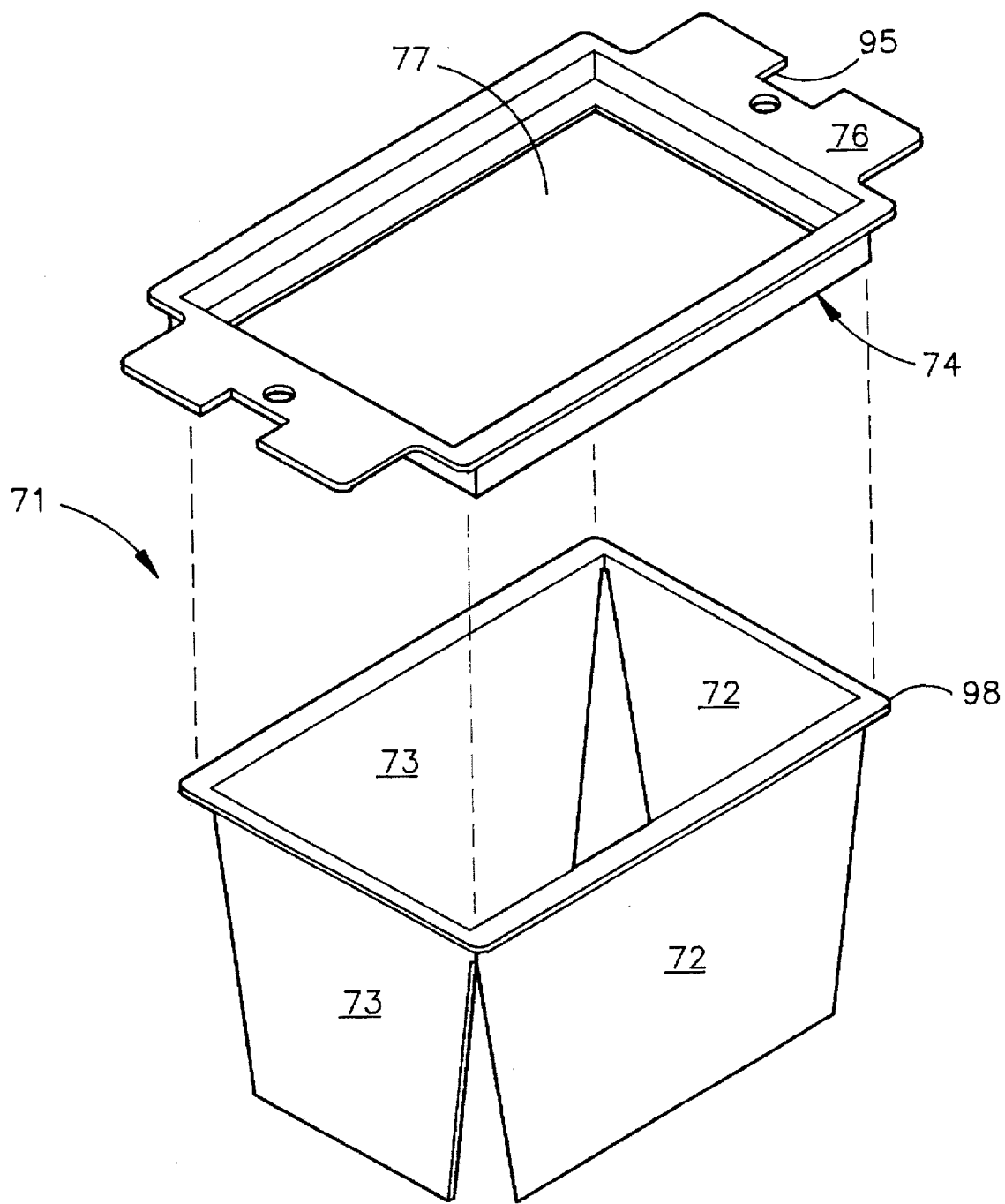
FIG. 6 is an exploded perspective view of a second embodiment of the electric box extender which includes insertable wings.

FIG. 6 is an exploded perspective view of a second embodiment 71 of the electric box extender which includes insertable wings. The second embodiment is, in effect, a two piece version of the preferred embodiment. There are two side wings 72 and two end wings 73 attached to an insertable rim 98. To form an electric box extender, the insertable rim 98 and its integral two side wings 72 and two end wings 73 are inserted or married into a complementary groove (not shown) in the back surface 74 of the face plate 76. A window 77 is formed in the center of the face plate 76 which allows space for mounting an electrical device (not shown). Also, the two U-shaped cut-outs 95 are shown. The second embodiment 71 of the box extender works in a manner analogous to the first embodiment with the exception that the second embodiment must be assembled by inserting the insertable rim 98 with integral side wings 72 and the integral end wings 73 into the groove in the back surface 74 of the face plate 76 prior to using the assembled box extender 71 with an existing electrical box recessed deep within a surface as a result of a renovation involving the installation of new sheet stock over the existing surface.

Figure 7:
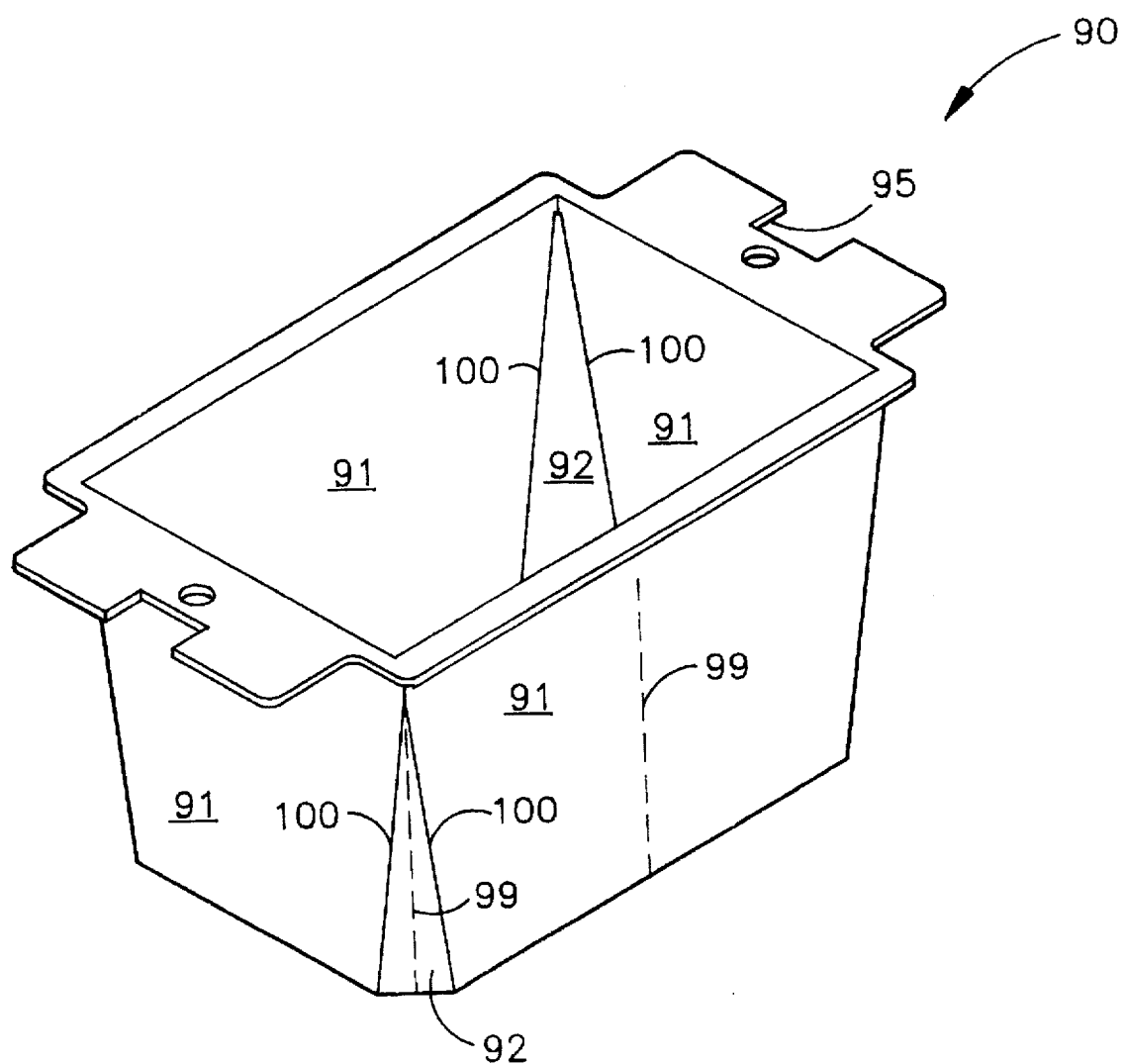
FIG. 7 is a perspective view of a third embodiment of the electric box extender which includes a one-piece extender having sides that can be easily trimmed to form wings if required in the particular installation.

FIG. 7 is a perspective view of a third embodiment 90 of the electric box extender which includes a one-piece extender having integral sides or wings 91 that can be easily trimmed to form wings if required in the particular application of the invention. If, for example, an electrical box within a wall has become recessed from the wall as a result of laying new sheet stock over the wall surface, the third embodiment 90 of the electric box extender may be used as is by sliding the sides 91 of the box extender into the existing electrical box. If resistance is encountered when inserting the box extender 90, then portions of the sides 91 may be trimmed away to allow it to fit around the obstruction. If the opening to the existing electrical box is smaller than the outer periphery of the box extender 90, then the corner walls 92 where the sides or wings 91 join may be trimmed away to create an extender with wings, similar to the first embodiment of the box extender, which may be inserted within the existing electrical box. Also, similar results may optionally be obtained by cutting on cut lines 99 in the corner walls 92 and or sides 91. The third embodiment functions similar to the preferred embodiment except for the corner walls 92 closing the corners of the wings by joining side edges 100 of adjacent wings. Cut lines 99 are located at the juncture of the corner walls 92 and sides 91.

The third embodiment is a one piece integral unit similar to the embodiment but may be made in two pieces (not shown) similar to the second embodiment by having an insertable rim and complementary grooved face plate.

Although there has been shown and described an example of what is at present considered the preferred embodiment of the present invention, it will be obvious to those skilled in the art that various changes and modifications may be made therein without departing from the scope of the invention as defined by the appended claims.

What is claimed is:

1. A plastic electrical box extender for extending existing electrical boxe so that the extended electrical box is flush with a surface comprising:

a face member having an outward side and an inward side and an axis through the center of said face member;

at least two flanges extending from and coplanar with said face member;

a plurality of inwardly extending flat wings each having a base and with a base edge, an inward edge opposite said base edge, and two side edges opposite one another with said wings extending from the inward side of said face, said wings symmetrically disposed about said axis through the center of said face member, said wings and said face forming a generally tubular body portion sized to receive an electrical device, said wings capable of flexing about said base toward said axis through said face thereby allowing said tubular body portion to be received within existing electrical box; and apertures through at least two of said flanges, said apertures capable of passing screws therethrough for securing said electrical box extender to said existing electrical box.

2. The electrical box extender of claim 1 wherein said face member is rectangular and said wings include two side wings and two end wings with said side wings being wider than said end wings.

3. The electrical box extender of claim 2 wherein said wings are flat and have a thickness of approximately 0.035 to 0.050 inches and may be easily manually trimmed to allow said wings to fit obstructions in said electrical box.

4. The electrical box extender of claim 3 wherein said thickness is approximately 0.042 inches.

5. The electrical box extender of claim 3 wherein said flanges each include a screw guidance member having a depth of approximately ⅛ to ⅜ inches.

6. The electrical box extender of claim 5 wherein said depth of said screw guidance member is approximately ¼ inch.

7. The electrical box extender of claim 3 wherein said wings are each of a trapezoidal shape with said inward edge being narrower than said base edge and said side edges converging toward said inward edge.

8. The electrical box extender of claim 7 where each of said wings include a base connector joining each adjacent wing together at their base ends.

9. The electrical box extender of claim 8 wherein each of said wings converge inwardly towards said axis.

10. The electrical box extender of claim 9 which includes four of said flanges.

11. The electrical box extender of claim 7 wherein each of said wings include a corner wall connecting said side edges of adjacent wings which is dividable to permit said wings to flex.

12. The electrical box extender of claim 1 wherein said face member and said flat wings are integrated into a one-piece unit.

13. The electrical box of claim 1 which includes a rim connecting said base ends of said flat wings and which is integral to said face member.

14. An electrical box extender for extending existing electrical boxe so that the extended electrical box is flush with a surface comprising:

a face member having an outward side and an inward side and an axis through the center of said face member;

at least two flanges extending from and coplanar with said face member;

grooves formed in said inward side of said face member;

a rim for inserting in said grooves;

a plurality of inwardly extending flat wings each having a base end with a base edge attached to said rim, an inward edge opposite said base edge, and two side edges; said wings capable of being inserted into said grooves in said face member, said wings extending from the inward side of said face when inserted in said grooves, said wings symmetrically disposed about said axis through the center of said face member, said wings and said face member forming a generally tubular body portion sized to receive an electrical device, said wings capable of flexing about said base toward said axis through said face member thereby allowing said tubular body portion to be received within an existing electrical box; and apertures through at least two of said flanges, said apertures capable of passing screws therethrough securing said electrical box extender to said existing electrical box.

15. A one-piece plastic electrical box extender for extending existing electrical boxe so that the extended electrical box is flush with a newly installed surface comprising:

a face member having an outward side and an inward side and an axis through the center thereof;

at least two flanges extending from and coplanar with said face member;

a plurality of sides extending from said inward side of said face member, each having a base end with a base edge and an inward edge opposite said base edge, two side edges with said sides symmetrically disposed about said axis through the center of said face member, said sides and said face member forming a generally tubular body portion sized to receive an electrical device, said sides capable of flexing about said base toward said axis through said face member thereby allowing said tubular body portion to be received within an existing electrical box;

corners connecting said side edges of said sides which are adjacent one another with said sides furthermore capable of having their corners removed to increase the degree of flexing about said base toward said axis through said face member to increase the amount of flexibility; and apertures through at least two of said flanges, said apertures capable of passing screws therethrough for securing said electrical box extender to said existing electrical box.

* * * * *